(12) United States Patent
Greve

(10) Patent No.: US 9,132,969 B2
(45) Date of Patent: Sep. 15, 2015

(54) FEED PADDLE FOR A PROCESSING APPARATUS

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 72 days.

(21) Appl. No.: 13/677,066

(22) Filed: Nov. 14, 2012

(65) Prior Publication Data

US 2014/0131172 A1 May 15, 2014

(51) Int. Cl.
| | |
|---|---|
| B65G 47/00 | (2006.01) |
| B65G 37/00 | (2006.01) |
| B01F 11/00 | (2006.01) |
| A22C 21/00 | (2006.01) |
| A22C 25/08 | (2006.01) |
| A22C 29/02 | (2006.01) |
| B01F 13/00 | (2006.01) |
| B65G 15/44 | (2006.01) |

(52) U.S. Cl.
CPC ............ *B65G 37/00* (2013.01); *A22C 21/0053* (2013.01); *A22C 25/08* (2013.01); *A22C 29/023* (2013.01); *B01F 11/0082* (2013.01); *B01F 13/0013* (2013.01); *B65G 15/44* (2013.01)

(58) Field of Classification Search
CPC .. B07B 13/65; B07B 2201/00; B28B 13/215; B28B 13/065
USPC ............ 198/550.2, 530, 531, 533, 534; 222/415, 232
See application file for complete search history.

(56) References Cited

U.S. PATENT DOCUMENTS

| | | | |
|---|---|---|---|
| 3,744,406 A | 7/1973 | Lapeyre et al. | |
| 4,323,178 A * | 4/1982 | Longinotti | 222/415 |
| 4,862,794 A | 9/1989 | Lapeyre et al. | |
| RE34,646 E * | 6/1994 | Lapeyre et al. | 99/443 C |
| 6,009,798 A | 1/2000 | Ledet et al. | |
| 6,065,607 A | 5/2000 | Magnusson et al. | |
| 6,321,914 B1 | 11/2001 | Magnusson et al. | |
| 6,427,823 B1 * | 8/2002 | Ishikawa et al. | 198/330 |
| 7,878,376 B2 * | 2/2011 | Ben Shlomo et al. | 222/368 |
| 2009/0263551 A1 * | 10/2009 | Van Praag et al. | 426/519 |
| 2011/0311321 A1 * | 12/2011 | Trueman | 406/146 |
| 2012/0193272 A1 | 8/2012 | Greve et al. | |
| 2014/0097091 A1 * | 4/2014 | Deligianni et al. | 205/145 |

* cited by examiner

*Primary Examiner* — Gene Crawford
*Assistant Examiner* — Lester Rushin
(74) *Attorney, Agent, or Firm* — Catherine M. Bishop

(57) ABSTRACT

An improved feed mechanism for a processor of solid objects includes a plunging paddle connected via connectors and eccentrics to a rotating shaft driven by a motor. The rotating shaft has an axis offset from the centers of the eccentrics. The plunging paddle plunges product on a conveyor belt from a feed tank to create a single layer for conveying the product to a processor.

20 Claims, 6 Drawing Sheets

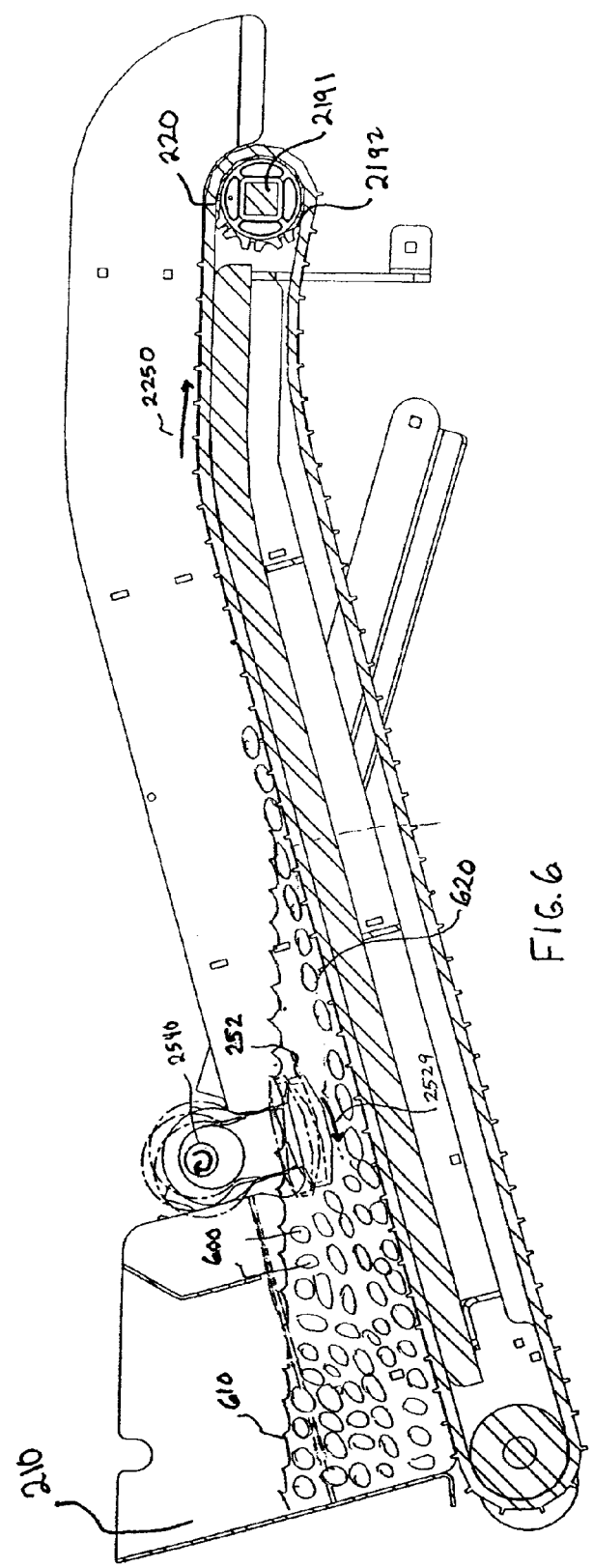

FEED PADDLE FOR A PROCESSING APPARATUS

BACKGROUND

The invention relates generally to apparatus and methods for processing solid objects and more particularly to infeed conveyors for processors.

Processors, such as graders, peelers, deheaders, freezers, coolers, and cookers, may process solid objects in batches. For example, graders may be used to sort objects into different sizes, or grades. Peelers may be used to removes shells or skins from objects. Deheaders may be used to remove the heads of shrimp and other food products. Solid objects that may be processed in batches include food products, such as fruits, vegetables, nuts, shellfish, portions of meat, poultry, and fish, and non-food products, such as ball bearings, castings, and aggregates.

Products to be processed are often deposited in a feed tank. Food products, such as shellfish are generally surrounded by fluid, such as water, in the feed tank. An endless conveyor belt lifts the products out of the tank into a processing section, such as a cooking compartment, and so on. For certain application, it may be advantageous to form a uniform or single layer of the product on the conveyor belt prior to processing.

SUMMARY

The present invention provides an improved feed mechanism for a processor of solid objects. The feed mechanism includes a plunging paddle connected to a rotating shaft driven by a motor. Connectors having eccentrics rotatably mounted therein connect the rotating shaft to the plunging paddle. The rotating shaft has an axis offset from the centers of the eccentrics. The plunging paddle plunges product on a conveyor belt from a feed tank to form a single layer for conveying the product to a processor. A pivotally connected guide arm guides the motion of the paddle.

According to one aspect of the invention, a feed mechanism for a processor comprises a plunging paddle having a bottom surface for agitating a product on a conveyor belt below the plunging paddle, at least one connector extending from an upper surface of the plunging paddle, an eccentric comprising a disc housed in the connector, and a rotatable shaft received in an opening of the eccentric. The opening is offset from the center of the disc.

According to another aspect of the invention, an infeed section for a processor comprises a feed tank for storing product to be processed in a fluid bath, an inclined conveyor belt for conveying product to be processed from the feed tank towards a processing section of the processor and a feed mechanism disposed above the conveyor belt outside of the feed tank for plunging product into a single layer on the conveyor belt. The feed mechanism comprises a plunging paddle connected to a rotatable shaft.

According to another aspect of the invention, a method of feeding product to a processor comprises the steps of providing product to be processed in a feed tank, conveying the product from the feed tank using an inclined conveyor belt, and plunging the product on the conveyor belt using a paddle connected to a rotating shaft.

BRIEF DESCRIPTION OF THE DRAWINGS

These features and aspects of the invention, as well as its advantages, are described in more detail in the following description, appended claims, and accompanying drawings, in which:

FIG. 6 is a cross-sectional side view of the feed mechanism during operation.

DETAILED DESCRIPTION

The present invention provides an improved feed mechanism for feeding solid objects, such as shrimp, squid, clams, fish, chicken, and other food or non-food items, to a processor, such as a grader, peeler, deheader, cooler, freezer or cooker. The feed mechanism controls the amount of product deposited on a conveyor belt for transport out of a feed tank to a processing region.

Figure 1:
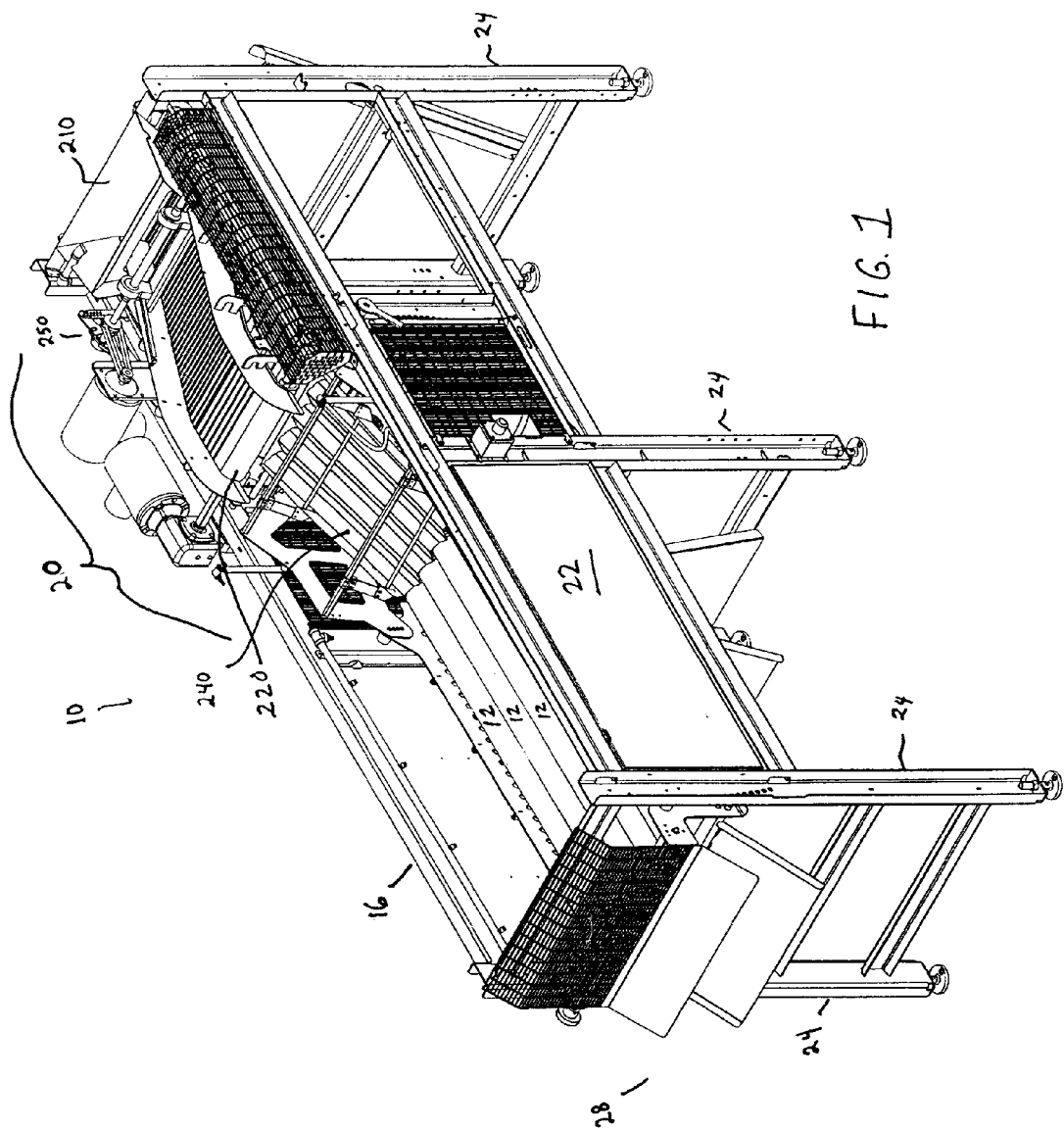
FIG. 1 illustrates a grader with an improved feed mechanism according to an illustrative embodiment of the invention.

FIG. 1 illustrates a grader 10 including a plunger-style feed mechanism of an illustrative embodiment of the invention. The feed mechanism may be used with any suitable solid object processor having a feed tank and is not limited to graders.

Figure 2:
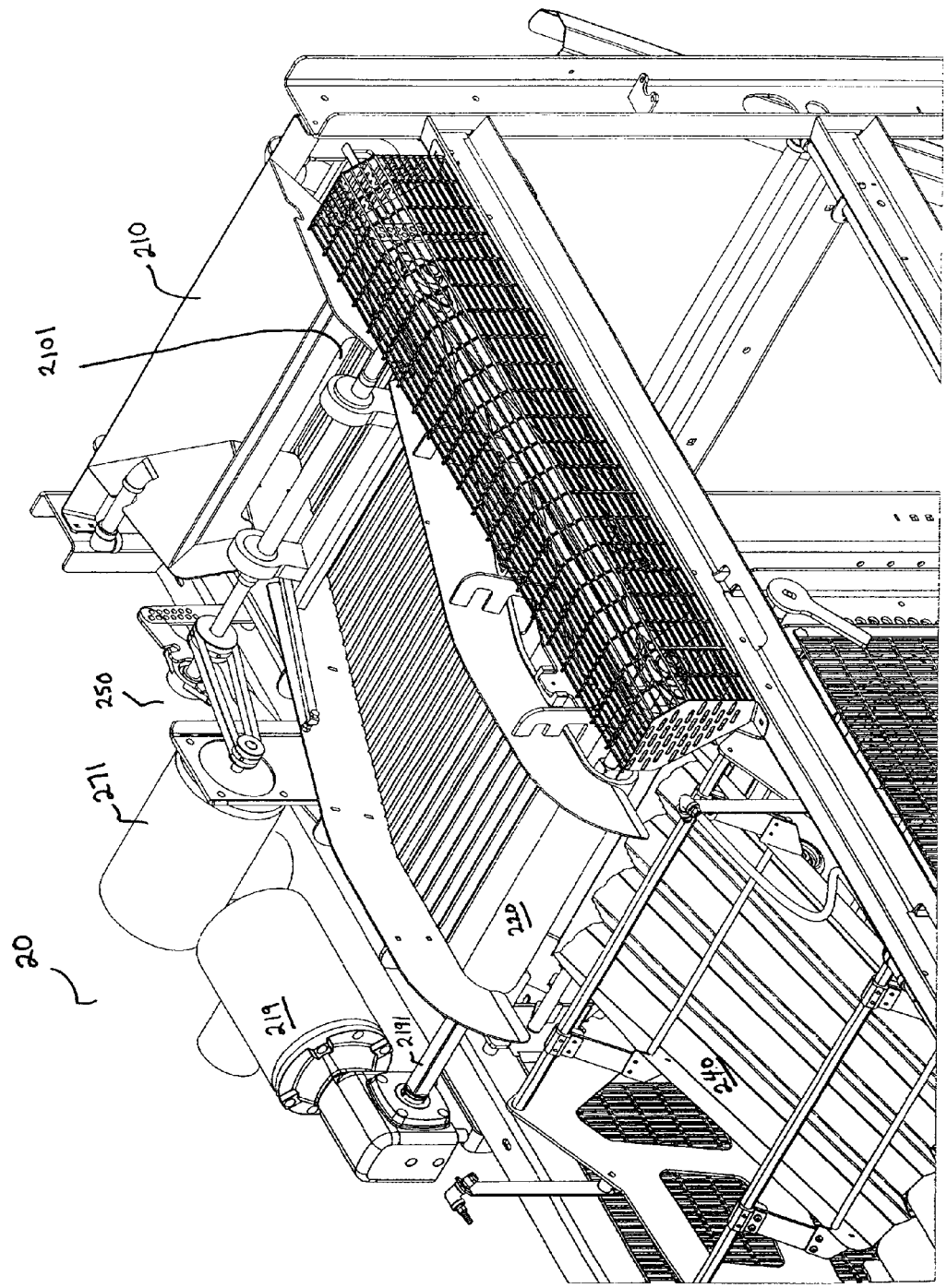
FIG. 2 is a detailed, close-up view of the infeed section of the grader of FIG. 1.
Figure 3:
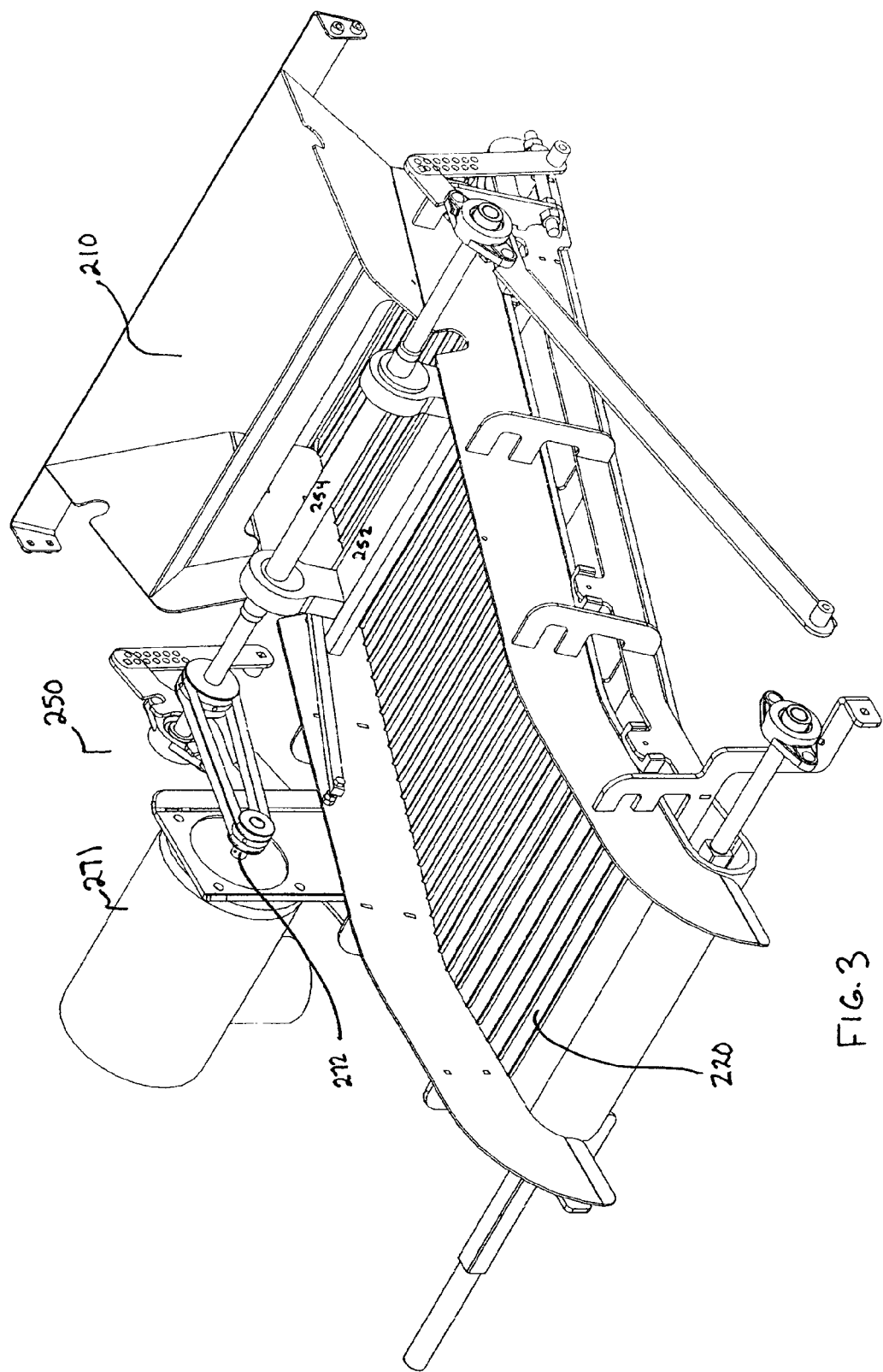
FIG. 3 is a close-up view of the feed tank and feed mechanism of the infeed section of FIG. 2.

The illustrative grader 10 includes an infeed section 20, shown in detail in FIGS. 2 and 3, a grading section 16 and an outfeed section 28. Products to be processed are immersed in a fluid, such as water, and stored in a feed tank 210 in the infeed section 20. The feed tank 210 includes an inclined conveyor belt 220 for transporting product out of the tank on the conveying surface of the conveyor belt 220. The inclined conveyor belt 220 lifts product out of the feed tank 210, through an opening 2101 in the side of the feed tank, and passes the products to a feed trough 240. The illustrative feed trough 240 comprises a plurality of feed channels for dividing a batch of product on the conveyor belt 220 into a stream of singulated products. The feed trough then feeds the singulated product to a processing section, such as the grading section 16. The processing section, illustrated as a grading section 16, performs a process, such as grading, peeling, deheading, cooking, cooling or freezing, on the products before passing the processed products to an outfeed section 28.

Figure 4:
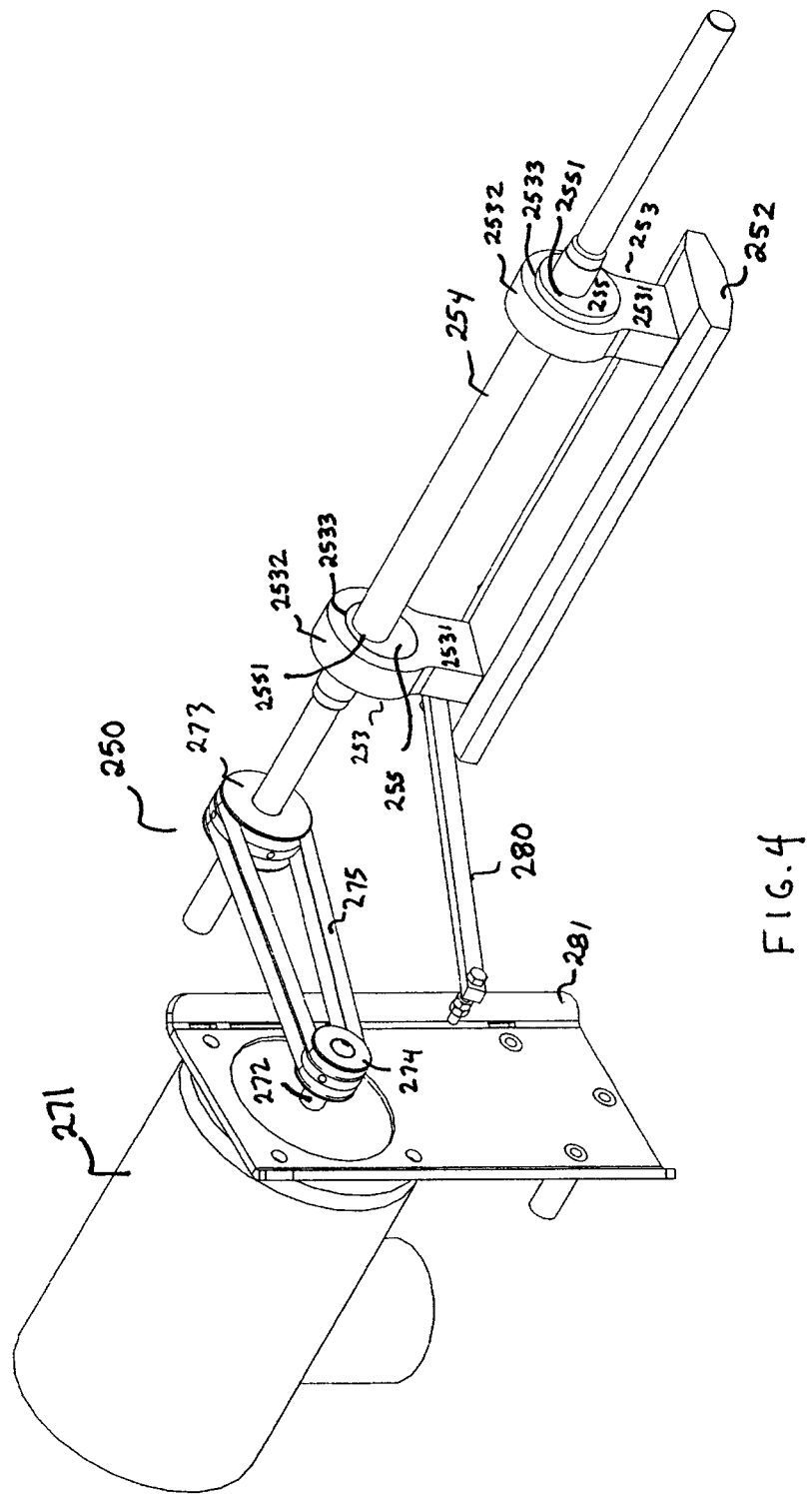
FIG. 4 is an isometric view of the feed mechanism of FIGS. 1-3.

A plunger-style feed mechanism 250, shown in FIG. 4, agitates the fluid surrounding the product passing out of the feed tank on the conveyor belt 220. The agitation of the fluid and subsequent settling of the product, which is heavier than the fluid, causes the product to form a single layer on the conveyor belt 220. The feed mechanism 250 controls the feed rate of the product to the feed trough 240. The feed mechanism 250 comprises a plunging feed paddle 252 connected to a rotating drive shaft 254 via connectors 253. The connectors 253 are keyhole-shaped extensions, each comprising a neck 2531, a rounded top 2532 and a circular opening 2533 in the rounded top. The feed paddle 252 is secured to the bottoms of the necks 2531 of each connector 253 at each end. The circular openings 2533 house eccentrics 255 receiving the rotating drive shaft 254. Each eccentric 255 is formed of a circular disc including an opening 2551 that is offset from the center of the disc. The offset opening receives the rotating drive shaft 254. The axis of the drive shaft is offset from the centers of the eccentric discs. When the shaft 254 rotates, the eccentrics 255 rotate with it, and the offset connection causes the paddle 252 to engage in a plunging motion.

As shown in FIGS. 2-4, the feed mechanism 250 further includes a driving mechanism for rotating the shaft 254 to induce the plunging motion in the paddle 252. The drive mechanism comprises a feed motor 271 having an output shaft 272. The output shaft 272 transmits power from the motor to the rotary shaft 254 via pulleys 273, 274 and belts 275. In one embodiment, the shaft 254 rotates at a rate of between about 300 revolutions per minute and about 400 revolutions per minute, and may rotate at a rate of about 350 revolutions per minute to induce the plunging action in the paddle 252.

Figure 5:
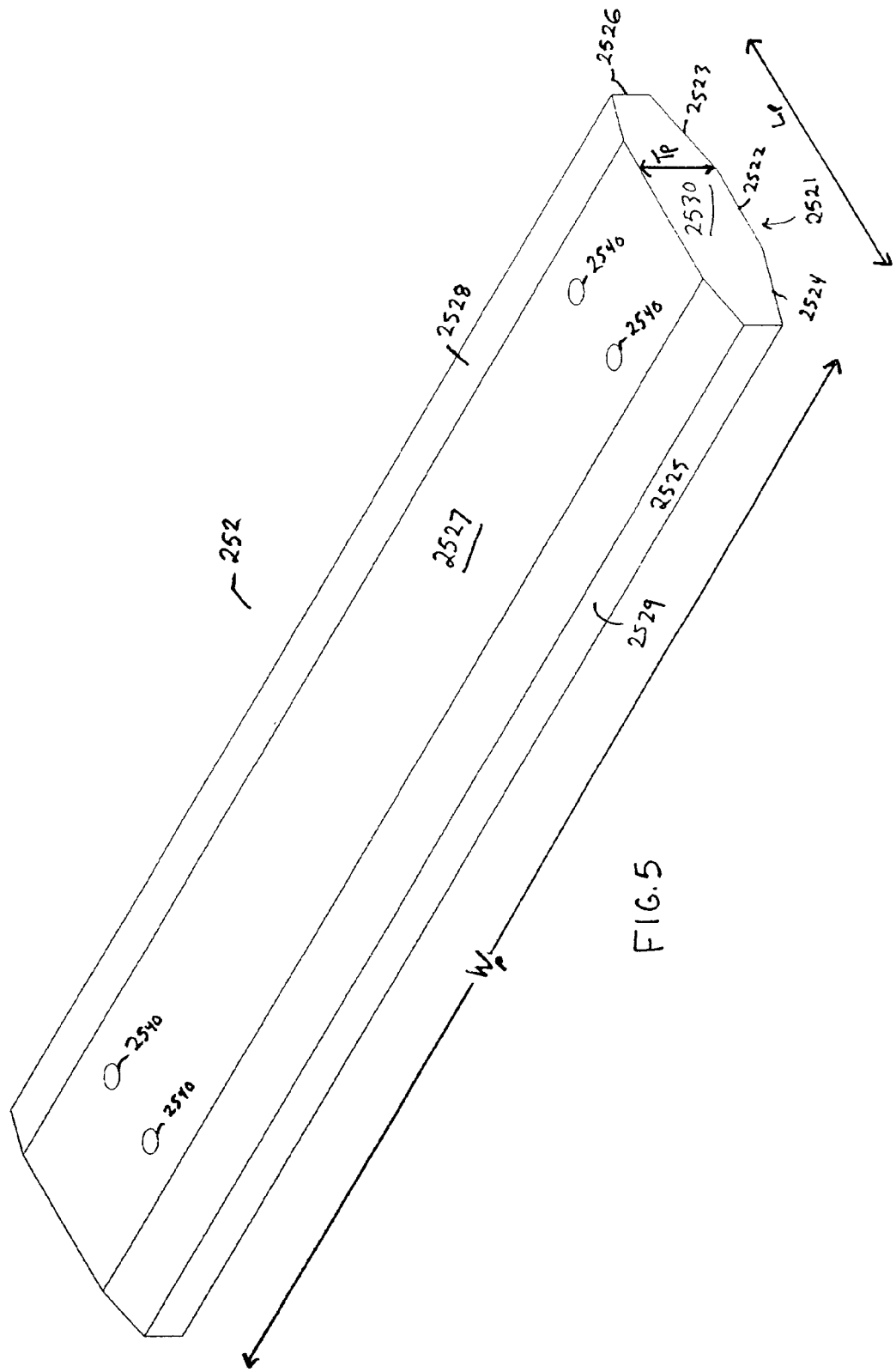
FIG. 5 is an isometric view of the paddle of the feed mechanism of FIG. 4.

An embodiment of the feed paddle 252 is shown in FIG. 5. The illustrative feed paddle 252 has a shaped bottom surface 2521 that faces the product on the conveyor belt. The illustrative feed paddle has a hexagonal cross-section, though the invention is not so limited. The bottom surface 2521 comprises a substantially flat central surface 2522 that is substantially parallel to the conveyor belt 220 and two beveled surfaces 2523, 2524. The feed paddle also includes flat front and rear surfaces 2525, 2526 and flat hexagonal side surfaces 2530. A top surface of the feed paddle 252 comprises a central flat surface 2527 and beveled surfaces 2528, 2529. The top flat central surface 2527 includes openings 2540 for coupling the connectors 253 to the top flat central surface 2527 using screws or another suitable device. The feed paddle has a width $W_p$ that preferably spans the width of the conveyor belt 220. The length $L_p$ and thickness $T_p$ can be any dimension suitable for creating a single row of product on the conveyor belt.

Referring back to FIG. 4, the feed mechanism 250 further includes a guide arm 280 for guiding the plunging paddle 252 through its plunging path. The guide arm 280 is pivotally connected at a first end to a fixed base 281, which, in the illustrative embodiment, also houses the motor 271. The second end of the guide arm 280 is pivotally connected to the neck 2531 of one of the connectors 253, so that the second end of the guide arm 280 rests above the top flat central surface 2527 of the feed paddle 252.

Referring to FIG. 6, to feed product to the grader or other processor, the feed tank 210 is filled with product 600 in a fluid bath 610, typically water, to a top level. A conveyor motor 219 (shown in FIG. 2) drives a conveyor shaft 2191, which in turn drives a sprocket 2192 (shown in FIG. 6) to drive the endless belt 220 in the direction of arrow 2250, towards the processing section of the grader. The drive shaft 254 preferably rotates in the direction of arrow 2540 to cause the paddle 252 to plunge back and forth. (The top portion of the rotatable shaft 254 rolls forward towards the processing section of the grader, while the bottom portion of the rotatable shaft 254 rolls back towards the feed tank 210.) At the bottom of the plunging paddle path, where the plunging paddle 252 is closest to the product on the conveyor belt, the paddle moves in a direction 2529 substantially opposite to the direction of conveyor belt travel 2250, pushing product against the conveyor belt. The dotted lines show the different positions of the paddle 252 and connectors 253 throughout the different rotational positions of the drive shaft 254. The paddle 252 agitates the fluid containing the product. The agitation from the plunging action shakes the product, allowing the product, which is heavier than the fluid, to settle into a single, stable, even layer 620 on the conveying surface of the conveyor belt 220 as the conveyor belt pulls the product from the feed tank 210.

The plunging feed mechanism 250 allows control of the feed rate of a product to a processing section. The feed rate may have a substantially linear relationship with the conveyor belt speed. In the illustrative embodiment, the stroke of the plunging paddle 252 is about one inch, though the invention is not limited to the illustrative embodiment.

The illustrative grading section 16 comprises planar array of grading channels, comprising grading rollers 12 separated across gaps. In this example, the grading section has three cylindrical rollers, all of the same diameter. But more or fewer rollers could be used to match the throughput requirement. The grading section extends in length in the axial direction of the rollers 12 from an infeed end to an opposite exit end and laterally in width from a first side more or less at the outer side of one of the outermost rollers to a second side at the outer side of the opposite outermost roller. Grading section 16 and all the other components of the grader are supported in a frame 22 having legs 24. An example of a suitable grader is described in U.S. patent application Ser. No. 13/342,266 entitled "Grader," the contents of which are incorporated by reference.

Alternatively, the feed mechanism 250 may be used with another type of grader, such as the grading machines described in U.S. Pat. Nos. 6,065,607 and 6,321,914, or other processor, such as the shrimp peeling systems, deheaders, or food cooking systems available from Laitram Machinery of Harahan, La.

Although the invention has been described in detail with reference to a few exemplary versions, other versions are possible. So, as these few examples suggest, the scope of the claims is not meant to be limited to the versions described in detail.

What is claimed is:

1. A feed mechanism for a processor comprising:
   a plunging paddle having a flat bottom surface for agitating a product on a conveyor belt below the plunging paddle;
   at least one connector extending from an upper surface opposite the flat bottom surface of the plunging paddle;
   an eccentric comprising a disc housed in the connector; and
   a rotatable shaft received in an opening of the eccentric, wherein the opening is offset from the center of the disc.

2. The feed mechanism of claim 1, further comprising a drive mechanism for rotating the shaft to cause the paddle to engage in a plunging motion.

3. The feed mechanism of claim 1, further comprising a pivotable guide arm extending between a fixed base and the connector for guiding the path of the plunging paddle.

4. The feed mechanism of claim 1, wherein the plunging paddle has a hexagonal cross section.

5. The feed mechanism of claim 1, wherein the connector comprises a key-hole shaped extension having a neck connected to the upper surface of the plunging paddle and a rounded top in which eccentric is housed.

6. The feed mechanism of claim 1, wherein a first connector is connect to a first side of the plunging paddle upper surface and a second connector is connected to a second side of the plunging paddle upper surface.

7. The feed mechanism of claim 1, wherein the rotatable shaft rotates in a direction such that an upper portion of the shaft rotates forward and the lower portion of the shaft rotates backwards, such that the plunging paddle plunges in a direction opposite a direction of travel of the conveyor belt.

8. An infeed section for a processor, comprising:
   a feed tank for storing product to be processed in a fluid bath;
   an inclined conveyor belt for conveying product to be processed from the feed tank towards a processing section of the processor; and
   a feed mechanism disposed above the conveyor belt outside of the feed tank for plunging product into a single layer on the conveyor belt, the feed mechanism comprising a plunging paddle connected to a rotatable shaft, the plunging paddle having a flat bottom surface and two beveled surfaces adjacent the flat bottom surface to form a shaped bottom to the plunging paddle.

9. The infeed section of claim 8, wherein the feed tank includes an opening for passing the conveyor belt therethrough.

10. The infeed section of claim 9, wherein the plunging paddle is adjacent to the opening in the feed tank.

11. The infeed section of claim 8, wherein the feed mechanism further comprises a first connector and a second connector extending from a top surface of the plunging paddle opposite the flat bottom surface and an eccentric disc housed in each connector.

12. The infeed section of claim 11, wherein the rotatable shaft passes through the eccentric discs, such that the axis of the rotatable shaft is offset from the centers of the eccentric discs.

13. The infeed section of claim 11, further comprising a pivotable guide arm extending between a fixed base and the first connector for guiding the path of the plunging paddle.

14. The infeed section of claim 8, wherein the plunging paddle has a hexagonal cross-section.

15. The infeed section of claim 8, wherein the plunging paddle spans the width of the conveyor belt.

16. The infeed section of claim 8, wherein plunging paddle plunges in a direction opposite a direction of travel of the conveyor belt.

17. A method of feeding product to a processor, comprising the steps of:
providing product to be processed in a feed tank;
conveying the product from the feed tank using an inclined conveyor belt moving in a first direction of travel; and
plunging the product on the conveyor belt using a plunging paddle connected to a rotating shaft, wherein the plunging paddle plunges in a direction opposite the first direction of travel, the plunging paddle having a flat bottom surface and two beveled surfaces adjacent the flat bottom surface to form a shaped bottom to the plunging paddle.

18. The method of claim 17, wherein the rotating shaft is received in two eccentric discs connected to the paddle via connectors, wherein the axis of the rotating shaft is offset from the centers of the eccentric discs.

19. The method of claim 17, wherein the step of plunging the product comprises rotating the shaft using a motor to cause the paddle to plunge.

20. The feed mechanism of claim 1, wherein the plunging paddle includes two beveled surfaces adjacent the flat bottom surface to form a shaped bottom to the plunging paddle.

\* \* \* \* \*